United States Patent [19]

Diery et al.

[11] 4,451,671

[45] May 29, 1984

[54] CATIONIC ETHYLENE OXIDE/PROPYLENE OXIDE AND ETHYLENE OXIDE/BUTYLENE OXIDE POLYMERS, A PROCESS FOR THEIR PREPARATION AND THEIR USE

[75] Inventors: Helmut Diery, Kelkheim; Norbert Wester, Hofheim am Taunus; Martin Hille, Liederbach, all of Fed. Rep. of Germany

[73] Assignee: Hoechst Aktiengesellschaft, Fed. Rep. of Germany

[21] Appl. No.: 412,527

[22] Filed: Aug. 30, 1982

[30] Foreign Application Priority Data

Sep. 12, 1981 [DE] Fed. Rep. of Germany ....... 3136212

[51] Int. Cl.³ ............................................. C07C 91/26
[52] U.S. Cl. .................................... 564/286; 564/290; 252/392; 252/398; 252/357
[58] Field of Search ................ 564/286, 290; 252/392, 252/394, 357

[56] References Cited

U.S. PATENT DOCUMENTS

| | | | |
|---|---|---|---|
| 2,560,280 | 7/1951 | de Benneville | 564/286 |
| 2,668,855 | 2/1954 | Goldberg et al. | 564/286 |
| 3,899,534 | 8/1975 | Rembaum et al. | 564/290 |
| 3,974,220 | 8/1976 | Heib et al. | 564/286 |
| 4,197,865 | 4/1980 | Jacquet et al. | 564/290 |

*Primary Examiner*—James H. Reamer
*Attorney, Agent, or Firm*—Connolly and Hutz

[57] ABSTRACT

Thus, the invention relates to compounds of the formula I

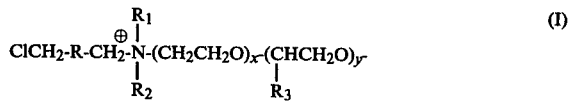

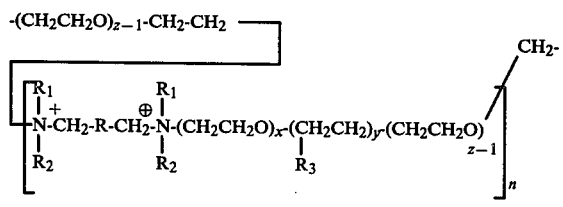

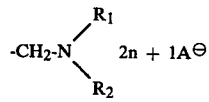

where R is aromatic, preferably phenylene, $R_1$ and $R_2$ denote $C_1$–$C_4$-alkyl, preferably $C_1$–$C_2$-alkyl, $R_3$ denotes methyl or ethyl, x and z together denote a number from 2 to 360, preferably from 2 to 140, y denotes a number from 15 to 70, preferably 25 to 60, n denotes a number from 1 to 10 and $A^-$ denotes an anion, preferably chloride or bromide, a process for their preparation and their use as demulsifiers for demulsifying crude oil emulsions and as corrosion inhibitors in equipment for lifting and processing natural gas and crude oil.

2 Claims, No Drawings

CATIONIC ETHYLENE OXIDE/PROPYLENE OXIDE AND ETHYLENE OXIDE/BUTYLENE OXIDE POLYMERS, A PROCESS FOR THEIR PREPARATION AND THEIR USE

It is known that, during the lifting of crude oil emulsions, there is an increase in the water content of the crude oils lifted. This water, which is also lifted, forms a water-in-oil emulsion with the crude oil, it being possible for salts, such as sodium chloride, calcium chloride and magnesium chloride, to be dissolved in the water present in the emulsion. In addition, carbon dioxide and hydrogen sulfide are frequently present in the crude oil emulsions. All these substances produce corrosion damage in the lifting equipment and in the refinery, so that it is necessary, for this reason alone, to remove the salt-containing water from the crude oil emulsion with the aid of demulsifiers.

A demulsifier has the purpose of breaking the emulsion, at a concentration used which is as low as possible, and of bringing about in this separation process a complete separation out of water and a reduction of the salt content to a minimum, as far as possible without expenditure or with a minimum amount of additional heat. The criteria for the quality of delivered crude oil are the residual content of salt and water content.

Crude oils have different compositions depending on their origin, and the natural emulsion stabilisers present in the oil have a complicated and variable chemical composition, so that specific demulsifying agents must be developed for each oil. The requirements placed on a demulsifier become even greater due to the varying conditions of lifting and processing. Due to the continuous opening up of new oilfields and change in the lifting conditions of old oilfields, the development of optimum demulsifiers for each particular purpose thus remains a pressing need.

It has now been found that new cationic ethylene oxide/propylene oxide and ethylene oxide/butylene oxide polymers exhibit good demulsifying and desalting properties for crude oils and also effectively inhibit corrosion.

Thus, the invention relates to compounds of the formula I

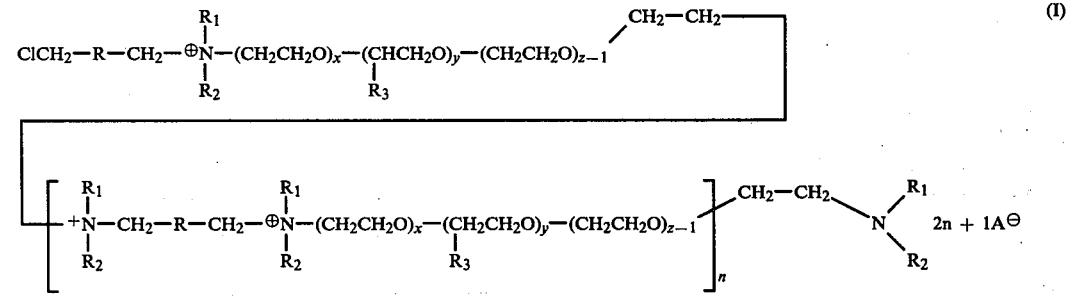

wherein R is aromatic, preferably phenylene, $R_1$ and $R_2$ denote $C_1-C_4$-alkyl, preferably $C_1-C_2$-alkyl, $R_3$ denotes methyl or ethyl, x and z together denote a number from 2 to 360, preferably from 2 to 140, y denotes a number from 15 to 70, preferably 25 to 60, n denotes a number from 1 to 10 and $A^-$ denotes an anion, preferably chloride or bromide. The groups $R_1$, $R_2$ and $R_3$ can be the same or different, and preferably $R_1$, $R_2$ and $R_3$ are the same. The values for x and z can also be the same or different.

The compounds of the formula I above are prepared by reacting a compound of the formula II

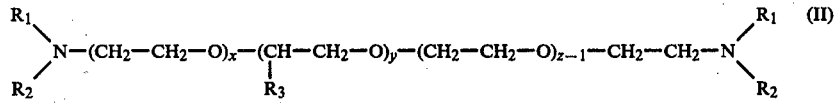

with a bis(halogenomethyl)aromatic compound, preferably bis(chloromethyl)benzene.

The diamines of the formula II serving as starting compounds are obtained by initially chlorinating, by known processes, an ethylene oxide/propylene oxide or ethylene oxide/butylene oxide block polymer of the formula III $$HO-(CH_2CH_2O)_x-(CHCH_2O)_y-(CH_2CH_2O)_z-H \quad (III)$$
$$| \atop R_3$$

for example with thionyl chloride alone or in an inert solvent at temperatures from about 80° to 120° C., preferably at 90° C. The 1,ω-dichloro compound of the formula IV obtained $$Cl-(CH_2CH_2O)_x-(CHCH_2O)_y-(CH_2CH_2O)_{z-1}-CH_2CH_2Cl \quad (IV)$$
$$| \atop R_3$$

is then reacted with an amine of the formula $NHR_1R_2$ to give the compounds of the formula II. This reaction is carried out by heating the reactants in aqueous-alcoholic solution for several hours at temperatures from about 80° to 200° C., preferably in isopropanolic solution in a stirred autoclave at 130° to 170° C.

The reaction of the diamines of the formula II with the bis(halogenomethyl)aromatic compounds is carried out by heating the reactants in a low-boiling alcohol at its boiling point for several hours, for example in ethanol, isopropanol or isobutanol. The molar ratio of diamine II to bis(halogenomethyl)aromatic compound is 1:1. The final products obtained are polymers, the chain length of which can be given approximately by the numbers 1 to 10 for the index n in the formula I.

The compounds according to the invention are yellow to brown, highly viscous products, which can be diluted in any ratio with water or water/alcohol mixtures.

They are very suitable for demulsifying emulsions of water and crude petroleum. These products are added to the crude oil emulsions in concentrations from 2 to 400, preferably 5 to 80 ppm, either in the undiluted form or as a solution which is diluted with an organic solvent in the ratio of 1:200. Furthermore, these compounds inhibit corrosion in equipment for natural gas and crude oil lifting and processing.

General preparation of the 1,ω-dichloropolyethers (IV)

2.4 moles of thionyl chloride are allowed to run into 1 mole of a diol of the general formula III, at 50° C., at such a rate that the internal temperature does not rise above 90° C. This temperature is maintained for 3 hours, the acid gases are removed by passing in a powerful stream of $N_2$, and the dichlorides IV are obtained in almost quantitative yield.

General preparation of the 1,ω-diamines (II)

1 mole of a dichloride of the formula IV, together with 10 moles of an amine of the formula $HNR_1R_2$, is stirred in aqueous-isopropanolic solution at 160° C. in an autoclave for 5 hours. 2 moles of solid KOH are added, the solution is decanted or filtered from the precipitated KCl, excess amine, isopropanol and water are removed by distillation and the 1,ω-diamines II are obtained in good yields.

General preparation of the polyquaternary ammonium compounds I 1 mole of 1,ω-diamine of the formula (II), together with 1 mole of a bis(halogenomethyl)aromatic compound, is heated in alcoholic solution under reflux for 6 hours. After removing the alcohol by distillation, the polyquaternary ammonium compounds I are obtained in almost quantitative yield.

EXAMPLE 1

387 g (0.2 mole) of an ethylene oxide/propylene oxide block polymer having a PyO block of 1,750 plus about 10% of EO, molecular weight 1,935 from the OH number, were reacted stepwise, in accordance with the general methods of preparation described above, with $SOCl_2$, dimethylamine and 1,4-bis(chloromethyl)benzene to give 410 g (95% of theory) of the polyquaternary compounds Ia.

($R_1=R_2=R_3=CH_3$, $y=30$)

$x+z=4.2$.

EXAMPLE 2

Starting from an ethylene oxide/propylene oxide block polymer having a PyO block of 1,750 plus about 20% of EO, molecular weight 2,550 from the OH number, the compound Ib was obtained in the same manner in a yield of 92% of theory.

($R_1=R_2=R_3=CH_3$, $y=30$).

$x+z=18.2$.

EXAMPLE 3

Starting from an ethylene oxide/propylene oxide block polymer having a PyO block of 1,750 plus about 40% of EO, molecular weight 2,700 from the OH number, the compound Ic was obtained in he same manner in a yield of 93% of theory.

($R_1=R_2=R_3=CH_3$, $y=30$)

$x+z=21.6$.

In the tables below are listed the demulsifying activities of the compounds I according to the invention on crude oil emulsions, under the conditions and using the amounts which are customary in the oilfields.

For this purpose, the demulsifiers were used in 50% strength isobutanolic solutions which are injected in micrometering devices. The separation-out of the emulsified water was carried out in conical tubes which were calibrated and could be stoppered and the amount of the emulsion was 100 cm³ in each case. The amounts of emulsion water which separated out in set times are reported in the tables in %. The absolute water content of the emulsions was determined in preliminary experiments by the Dean-Stark method in each case. The amount of demulsifiers added, the absolute water content of the emulsion, the separating temperature and the origin of the emulsion are listed in the individual tables.

TABLE 1

Demulsification temperature: 75° C.
Water content of the emulsion: 33%
Amount added: 80 ppm
Origin: Bachaquero/Venezuela

| Example | % separation of water Hours: | | | | |
|---|---|---|---|---|---|
| | 1 | 3 | 6 | 12 | 18 |
| 1 | 28 | 42 | 53 | 72 | 98 |
| 2 | 18 | 34 | 46 | 65 | 99 |
| 3 | 66 | 76 | 85 | 97 | 100 |
| no demulsifier | 0 | 0 | 0 | 0 | 0 |

TABLE 2

Demulsification temperature: 55° C.
Water content of the emulsion: 27%
Amount added: 35 ppm
Origin: Hassi Messaoud/Algeria

| Example | Minutes | | | | |
|---|---|---|---|---|---|
| | 10 | 20 | 30 | 60 | 120 |
| 1 | 65 | 76 | 84 | 93 | 98 |
| 2 | 88 | 93 | 98 | 100 | 100 |
| 3 | 48 | 73 | 86 | 94 | 100 |
| no demulsifier | 0 | 0 | 0 | 0 | 0 |

TABLE 3

Demulsification temperature: 65° C.
Water content of the emulsion: 17.5%
Amount added: 40 ppm
Origin: Sarir/Libya

| Example | % separation of water Minutes: | | | | |
|---|---|---|---|---|---|
| | 30 | 60 | 90 | 120 | 180 |
| 1 | 8 | 29 | 56 | 83 | 98 |
| 2 | 42 | 81 | 90 | 96 | 100 |
| 3 | 76 | 86 | 94 | 99 | 100 |
| no addition | 0 | 0 | 0 | 0 | 0 |

Inhibition of corrosion

In order to find the activity as a corrosion inhibitor, test strips of carbon steel having a surface area of 20 cm² were immersed in 20% strength sodium chloride solutions at 60° C. for 6 hours in each case, the solutions containing an addition of 10 mg/liter, 20 mg/liter or 30 mg/liter of the product to be tested. A continuous stream of carbon dioxide was bubbled through the test solution during the test. The inhibition is reported as a %, the blank value without the inhibitor being 0% as a comparison value.

The results obtained are compiled in Table 4.

TABLE 4

| Amount employed (mg/liter) | 10 | 40 |
|---|---|---|
| | (% protection) | |
| Example 1 | 16.3 | 70 |
| Example 2 | 14.0 | 65 |
| Example 3 | 12.0 | 60 |

We claim:

1. A compound of the formula

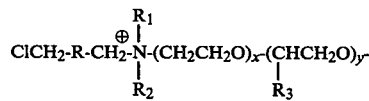
(I)

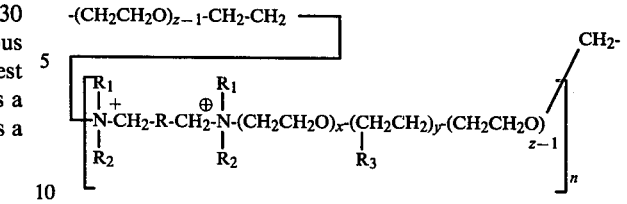

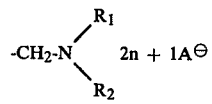

wherein R is phenylene, $R_1$ and $R_2$ denote $C_1$–$C_4$-alkyl, $R_3$ denotes methyl or ethyl, x and z together denote a number from 2 to 360, y denotes a number from 15 to 70, preferably n denotes a number from 1 to 10 and $A^-$ denotes an anion.

2. A compound according to claim 1 wherein $R_1$ and $R_2$ denote $C_1$ or $C_2$ alkyl, x and z together denote a number from 2 to 140, y denotes a number from 25 to 60, and said anion is chloride or bromide.

* * * * *